United States Patent Office 3,644,293
Patented Feb. 22, 1972

3,644,293
INHIBITING ETHERIFICATION IN CATALYTIC
ESTERIFICATION
Glenn D. Fielder, Beaumont, Tex., assignor to
Mobil Oil Corporation
No Drawing. Filed Dec. 30, 1968, Ser. No. 788,056
Int. Cl. C08g 17/003, 17/013; C07c 67/00
U.S. Cl. 260—75 R                                  8 Claims

ABSTRACT OF THE DISCLOSURE

Undesired ether formation is suppressed in catalytic esterification by introducing ammonia or preferably an amine (e.g. trimethylamine) in a reaction mixture containing a carboxylic acid (e.g. terephthalic acid), an alcohol (e.g. ethylene glycol) and an organo-titanium or organo-zirconium esterification catalyst, such as diisopropyl di-triethanolamine titanate. It is often preferable to use a volatile nitrogenous base that can be readily stripped from the reaction mixture, especially at temperatures suitable for condensation of the product ester into the low molecular weight polyesters known as "prepolymer."

BACKGROUND OF THE INVENTION

Field of the invention

This invention relates to the improved esterification of aliphatic and aromatic monocarboxylic and polycarboxylic acids with alcohols containing one or more hydroxyl groups in the presence of certain nitrogenous bases and of certain metallo-organic esterification catalysts containing either titanium or zirconium; it is also concerned with the condensation of the resulting ester product into "prepolymer" material in the form of low order polyesters, and subsequently into higher polymers.

The process is particularly useful in the production of glycol esters of aromatic polycarboxylic acids, as exemplified by producing a high purity ethylene glycol ester of terephthalic acid as an intermediate for preparing high molecular weight polyethylene terephthalate suitable for fabrication into films, tapes and fibers.

Prior art

The esterification of various carboxylic acids with monohydric and polyhydric aliphatic alcohols is well known and many catalysts have been employed to increase the reaction rates and yields. The organo-titanium and organo-zirconium catalysts described in Werber Pat. No. 3,056,818 are good catalysts for esterification reactions in general, and they produce excellent yields at relatively good reaction rates in the esterification of aromatic dicarboxylic acids with lower aliphatic alcohols and glycols. However, some etherification occurs with these catalytic agents present, as with many other esterification catalysts, and it is important in some cases to minimize or eliminate ether formation for reasons described hereinafter.

It is well known that glycol esters, from which film- and fiber-forming polyesters of aromatic dicarboxylic acids are produced, can be prepared by directly esterifying the aromatic dicarboxylic acid with a glycol or by first esterifying the aromatic dicarboxylic acid with a monohydric alcohol and then transesterifying the resulting diester of the acid with a glycol. Although direct esterification of the aromatic dicarboxylic acid with a glycol has the obvious advantage of not requiring intermediate conversion of the acid to an alkyl diester, most of the previous commercial practice, particularly in the case of terephthalic acid, has involved preparing the glycol esters by the indirect process.

One reason that has favored use of the indirect process for the esterification of terephthalic acid is that the presence of even small amounts of impurities have a highly deleterious effect on the polymeric product, and crude terephthalic acid is a high melting material which does not lend itself to ready purification by conventional techniques. Since the esterification of terephthalic acid with lower alkanols, such as methanol, yields dialkyl terephthalates which can be conveniently purified by conventional methods, such as distillation and crystallization, it has been generally considered more practical to purify the acid indirectly as its dialkyl ester. However, more recently developed methods of purifying terephthalic acid provide a very high purity product suitable for use of the acid in production of film and fiber-forming polyesters from glycol terephthalates prepared by direct esterification of the acid with a glycol; and the substantial economic advantage of eliminating intermediate conversion of the acid to a diester which must then be transesterified has redirected attention to the direct esterification method for producing glycol terephthalates.

In general, the direct esterification of an aromatic dicarboxylic acid with a glycol is carried out in the presence of a catalyst which accelerates the reaction. Unfortunately, such reactions also produce byproducts which deleteriously affect the properties of polymers obtained by polycondensation of the desired esterification products. For example, reactions of the difunctional glycol form ether linkages which, under polycondensation conditions, become a part of the resulting polymeric product and adversely affect its hydrolytic stability, ultraviolet light stability, and hot-wet ("wash and wear") and dye retention properties. Since the esterification and subsequent polymerization steps are customarily integrated in the production of aromatic dicarboxylic acid polyesters, whereby impurities present in the glycol esters of the aromatic dicarboxylic acid become a part of the polymeric product, it is highly desirable to accelerate the direct esterification under conditions which suppress or inhibit side reactions, particularly the formation of ethers. Also, the presence of a free glycol ether (e.g. diethylene glycol) in a polymeric glycol-terephthalte composition has the disadvantageous effect of reducing the melting point.

The present invention, which provides a catalytic esterification process in which etherification reactions are minimized, is herein described with particular reference to esterifying terephthalic acid with ethylene glycol. However, it should be understood that description of the present method with respect to specific reactants, catalyst and nitrogenous base is intended merely for purposes of fully detailed illustration and valid comparison of results and that the present invention is useful for esterification of a great variety of carboxylic acids and alcohols using other catalysts and nitrogen-containing bases as set forth hereinafter.

SUMMARY OF THE INVENTION

This is an improved process for the liquid phase esterification of carboxylic acids or anhydrides with monohydric or polyhydric alcohols in a reaction mixture containing a catalyst of the group consisting of organo-titanium and organo-zirconium esterification catalysts wherein the improvement resides in incorporating a nitrogeneous base of the group consisting of ammonia and amines in the reaction mixture.

Other aspects of the invention relate to preferred types and species of the basic additive as well as the reactants and catalyst. The invention also includes optional further condensation of product esters to form low molecular weight polyesters, and polycondensation into higher polymers.

A more selective reaction is obtained by the inclusion of ammonia or an amine in the reaction mixture to inhibit the formation of ethers while obtaining high yields of esters; moreover, the reaction rate is apparently accelerated in at least some instances.

DESCRIPTION OF SPECIFIC EMBODIMENTS

While the instant process is especially advantageous for the production of terephthalic acid esters and prepolymer as items of considerable commercial importance, it is also suitable for the esterification of any mono or polycarboxylic acid or anhydride in general, including unsubstituted and substituted aliphatic, cycloaliphatic and aromatic carboxylic acids.

Representative aliphatic acids include acetic, hydroacetic, chloroacetic, bromoacetic, cyanoacetic, phenylacetic, triphenyl acetic, propionic, halopropionic, lactic, beta-hydroxy propionic, n-butyric, isobutyric, n-valeric, isovaleric, 5-phenyl-n-valeric, n-heptoic, caproic, pelargonic, lauric, palmitic, lignoceric, alpha-hydroxy lignoceric, malonic, succinic, glutaric, adipic, pimelic, azelaic, sebacic, decane-1,10-dicarboxylic, pentadecane-1,15-dicarboxylic, pentacosane-1,25-dicarboxylic, 1,2,3-propane tricarboxylic, citric, acrylic, alpha-chloro acrylic, beta-chloro acrylic, beta-bromo acrylic, beta-phenyl acrylic, methacrylic, vinyl acetic, crotonic, angelic, tiglic, undecylenic, oleic, erucic, linoleic, linolenic, maleic, fumaric, mesaconic, citraconic, itaconic, muconic and aconiti acids.

Among the alicyclic acids are cyclopropane carboxylic, cyclobutane carboxylic, cyclopentane carboxylic, cycloheptane carboxylic, cyclohexane carboxylic, 2-hydroxy cyclohexane carboxylic, 1,1-cyclopropane dicarboxylic, 1,2-cyclobutane dicarboxylic, 1,3-cyclobutane dicarboxylic, 1,4-cyclohexane dicarboxylic, cyclohexane-1,2,3,4,5,6-hexacarboxylic, cyclopentene-2-carboxylic, 1-cyclohexene-1-carboxylic, hydrocapric, cyclohexadiene-1,2-dicarboxylic, and 1,3-cyclohexadiene-1,4-dicarboxylic acids.

The aromatic acids include benzoic, o, m and p-chloro and bromo benzoic, o, m and p-hydroxy benzoic, o, m, and p-nitrobenzoic, alpha-naphthoic, beta-naphthoic, o, m and p-methyl benzoic, o, m and p-ethyl benzoic, p-phenyl benzoic, phthalic, isophthalic, terephthalic, hydroxy phthalic, 2,3-dimethyl benzoic, benzene-1,2,4-tricarboxylic, benzene-1,3,5-tricarboxylic, benzene-1,2,4,5-tetracarboxylic and mellitic acids.

Anhydrides of mono and dibasic acids can be used in place of the acids. These include acetic anhydride, propionic anhydride, n-butyric anhydride, succinic anhydride, glutaric anhydride, adipic anhydride, pimelic anhydride, maleic anhydride, mesaconic anhydride, citraconic anhydride, glutaconic anhydride, itaconic anhydride, phthalic anhydride, benzoic anhydride and mixed anhydrides of monobasic acids.

A wide selection of substituted as well as unsubstituted mono and polyhydroxy alcohols may be employed in the present process as exemplified by those containing halogen atoms, olefinic, aromatic, cycloaliphatic, nitro and/or cyano radicals, etc. For instance, suitable alcohols include

| | |
|---|---|
| methanol, | isopropanol, |
| ethanol, | n-butanol, |
| chloroethanol, | secondary butanol, |
| cyanoethanol, | 2-nitropropanol-1, |
| phenylethanol, | 1-chloropropanol-2, |
| n-propanol, | 2-nitrobutanol-1, |
| 2-chloropropanol-1, | 2-methyl pentanol-1, |
| 3-bromo-propanol-1, | 2-methyl pentanol-3, |
| 2,2-dichloropropanol-1, | | the primary and secondary octanols, n-dodecanol, 6-dodecanol, lauryl, myristyl, stearyl, 2-propenol-1-, 2-butenol-1, 3-pentenol-1, ethylene glycol, trimethylene glycol, tetramethylene glycol, pentamethylene glycol, glycerol, 1,4-butanediol, pentaerythritol, decane-1,10-diol, pentadecane-1,15-diol, pentacosane-1,25-diol, 2,4-hexadiene-1,6-diol, 2,4-octadiene-1,8-diol, benzyl alcohol, o, m and p-nitrobenzyl alcohol, o, m and p-methyl benzyl alcohol, phenyl ethyl alcohol, triphenyl ethyl alcohol, o, m and p-benzyl benzyl alcohol, alpha-naphthyl-ethyl alcohol, beta-naphthyl ethyl alcohol, naphthylene-1,2-diethyl alcohol, phenylene-1,3,5-triethyl alcohol, and phenylene-1,4-dioctyl alcohols.

The present process has particular application to reactions with glycols, especially ethylene glycol, 1,4-cyclohexanedimethanol and other lower alkylene glycols containing from 2 to 8 carbon atoms, in view of the proclivity of these alcohols to form ether compounds.

The nitrogeneous base that is employed in the process of this invention may be ammonia or an amine of the alkyl, cycloalkyl, heterocyclic or aromatic type. It is usually advantageous to employ an amine which can be readily stripped from the product mixture during or after the reaction by heating and/or the use of subatmospheric pressures, because it is often either necessary or desirable to remove nitrogeneous materials prior to polymerizing the reaction products into high molecular weight polymers. Specific examples of suitable amines include the lower alkyl amines which contain alkyl groups having one to four carbon atoms, such as n-butylamine, diisopropylamine, di-n-propylamine, di-n-butylamine, diisobutylamine, trimethylamine, triethylamine and tripropylamine as well as such others as pyridine, piperidine, lutidines, picoline, aniline, morpholine and its N-methyl derivative.

In the esterification of terephthalic acid with alkylene glycol, amines such as trimethylamine, triethylamine, diisopropylamine, di-n-butylamine and tripropylamine which are more volatile than the glycol reactants are preferred as they can be more easily removed from the esterification product mixture prior to polycondensation thereof, thereby giving rise to ultimate polymeric products of superior color characteristics.

Suitable catalysts for the instant process are disclosed in Werber Pat No. 3,056,818 and may be defined by the formula $MX_4$ in which M is either titanium or zirconium and X is a hydroxyl, alkoxy, acyloxy, hydroxy-alkoxy, or amino-alkoxy radical and at least one X is an organic radical containing from 2 to 18 carbon atoms. Of these, organo-titanium catalyst are particularly desirable, especially those of low susceptibility to hydrolysis as exemplified by amino-alcohol chelates with titanium in which one or more X symbols represents the group

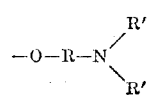

wherein R is a lower alkylene radical (e.g., an ethylene or propylene radical) and R' represents hydrogen or an alkyl or alkylol radical. While an alkyl alkanolamine ortho-titanate catalyst, such as diisopropyl di-triethanolamine titanate, is often preferred for esterifying terephthalic acid with the glycol, many other organic titanium or zirconium compounds are suitable for a variety of esterification reactions.

Typical chelated esters which may be utilized as catalysts include, inter alia, tetra-(ethylene glycol) titanate, tetra-(propylene glycol) titanate, tetra-(butylene glycol) titanate, tetra-(octylene glycol) titanate and tetra-(poly)-ethylene glycol) titanate, dibutyl di-(ethylene glycol) titanate, diisopropyl di-(octylene glycol) titanate, dimethyl, di-(octylene glycol) titanate, diethoxy di-(octylene glycol) titanate, tetra-triethanolamine titanate, tetra-triethanolamine-N-oleate, triethanolamine-N-stearate, triene glycol) titanate, tetra-triethanolamine titanate, tetra-ethanolamine-N-linseed acid salt, dibutyl, dipropyl, dimethyl, diethyl, and other dialkyl di-(amino alcohol) titanates. The corresponding zirconium chelates are also useful as catalysts.

Typical titanium acylates which can be employed as catalysts include acylates from 2 to about 18 carbon atoms, such as hydroxy titanium acetate, hydroxy titanium butyrate, hydroxy titanium pentanoate, hydroxy titanium octanoate, hydroxy titanium dodecanoate, hydroxy titanium tetradecanoate, hydroxy titanium hexadecanoate, hydroxy titanium octadecanoate, hydroxy titanium oleate, hydroxy titanium soya acylate, hydroxy titanium castor acylate, methoxy titanium acetate, isopropoxy titanium pentanoate, butoxy titanium hexanoate, isopropoxy titanium octanoate, isopropoxy titanium decanoate, isopropoxy titanium tetradecanoate, isopropoxy octadecanoate, isopropoxy titanium oleate, propoxy titanium soya acylate and the corresponding zirconium compounds.

The proportions of reactants and catalyst utilized in the present process may be varied widely and often may correspond with quantities employed in prior art methods. For illustration, the ratio of alcohol equivalents to carboxylic acid equivalents may range from about 1:1 to 20:1, respectively. In preparing the diester of a diol, such as ethylene glycol, with terephthalic acid, molar ratios between about 10:1 and 20:1, respectively, are suitable when a monomeric product is sought but lower ratios ranging down to the level of about 1.2:1–1.7:1 are more desirable in the manufacture of polymeric products.

The metallo-organic catalyst may be charged in an amount ranging from about 0.01 to 10% or more of the weight of esterifiable acid, although there is seldom, if ever, any advantage in using more than about 1% of the catalyst.

The quantity of ammonia or amine introduced into the reaction mixture may vary widely for small amine concentrations of the order of the catalyst concentration generally have a significant effect, yet large amounts do not appear to be harmful. Accordingly, the weight of nitrogenous base charged may range from as little as 0.01% of the esterifiable acid to 10.0% or more, and it also usually amounts to 10% or more of the weight of metallo-organic catalyst. In the case of an amine which is gaseous under the reaction conditions, very little of the amine appears to be retained within the hot liquid reaction slurry; hence an adequate supply of the amine may readily be provided by merely bubbling a substantial excess of amine through the reaction mixture during a substantial part or the entire reaction period, and the amine escaping from the reaction mixture may be recovered and used again. With any selected combination of reactants, catalyst, nitrogenous base and reaction conditions, the minimum amount of base required to produce the desired effects in best determined by simple experimentation.

Known reaction conditions of temperatures, pressure and time are usually employed in the practice of this invention, and these factors are, of course, interrelated. For example, it is only necessary to have a reaction pressure that is sufficient to maintain the reaction mixture in the liquid phase; and atmospheric pressure is often preferred, but vacuum or elevated pressures (e.g., 20 atmospheres or more) may be permissible or necessary depending on the selected reaction temperature and the nature of the materials in the charge.

Catalytic esterification reactions generally proceed very slowly at room temperatures and elevated temperatures are commonly employed with due attention to the avoidance of temperatures that will decompose any of the reactants or product esters. After selection if the reactant and catalysts, suitable and optimum reaction temperatures can be readily ascertained by trial with due attention to the reflux temperature at atmospheric pressure which often produces excellent results. As an illustration, temperatures for general usage may extend from about 120 to 500° F. For reactions of ethylene glycol with terephthalic acid, temperatures between about 365 and 400° F. are suitable and the range of about 380 to 395° F. under reflux conditions is usually preferred.

Appropriate reaction or residence times are dependent upon the specific reactants, choice of catalyst and the desired degree of conversion which typically is substantially maximum conversion, and this also may be readily ascertained by trial. In esterifying terephthalic acid with ethylene glycol, the duration of a batch reaction may range from about 1 to 10 or more hours depending on the temperature and the catalyst concentration, and high yields of the bis-ester are usually obtainable in about 3 to 6 hours.

In most esterification reactions, it is desirable to continuously remove in known manner the water formed therein in order to shift the reaction equilibrium toward complete esterification. The instant method is equally adaptable to either batch processing or the continuous operations which are usually preferred for large scale manufacture.

As indicated earlier, it is sometimes desirable to remove the nitrogenous base substantially completely from the product mixture and this may be accomplished in many instances by merely shutting off the supply of ammonia or amine and maintaining the reaction temperature while removing such compounds as they bubble out of the reaction mixture. A reduced pressure or increased temperature or both can be utilized for the purpose in the case of less volatile amines.

The foregoing reaction conditions are directed essentially to the formation of monomeric esters. Where the objective is the production of prepolymer material such as the lower polyesters of dicarboxylic acids, the recommended reaction conditions include the aforementioned lower glycol-acid molar ratio of about 1.2:1 to 1.7:1 and removing vaporized glycol from the reaction vessel after esterification has proceeded to a substantial degree, as exemplified by the esterification of 50% or more of the acid radicals present at the start. Initially, reflux conditions are usually preferred to condense glycol vapor and return it to the reaction vessel in order to promote esterification; then the glycol vapor is withdrawn to promote condensation of the ester into low order polymers under the influence of stepwise or gradual reduction of the pressure to as low as a few millimeters of mercury (absolute) and/or raising the temperature in the same manner up to as much as 100° F. or more above the initial stage reaction temperature. Any residual ammonia or amine is also withdrawn during the second stage. By this procedure, glycol polyester prepolymers having an average degree of polymerization of about 9 to 50 or more and a weight average molecular weight of about 1800 to 10,000 are obtainable.

Glycol terephthalate prepolymers prepared in the aforesaid manner are particularly suitable for polycondensation under conventional reaction conditions using either the melt phase or solid state polymerization techniques in forming high polymers of the order of 17,000 molecular weight for use in fibers or 25,000 for tire cord material. Many of the metallo-organic esterification catalysts, especially the alkyl alkanolamine ortho-titanates, are also good polycondensation catalysts and thus may be retained in the material for this purpose, or another suitable polycondensation catalyst (e.g., antimony trioxide) may be added. Based on the terephthaic acid originally charged, the total weight of the polycondensation catalyst may desirably range from about 0.025 to 0.2% or more. Temperatures in the range of about 425–535° F. are generally appropriate for poycondensation and nitrogen or another inert gas may be used to sparge the reaction mixture during part or all of the operation while the absolute pressure is usually being reduced below 10 mm. and preferably below about 1 mm. of mercury. The reaction is terminated when polymeric material of the desired weight is obtained and this may be determined by its viscosity or other physical measurements.

For a better understanding of the nature and objects of this invention, reference should be had to the following tabulated examples, wherein examples illustrative of the invention are designated by numerals and a comparative example is designated by the letter A. Unless otherwise specified herein, all proportions are set forth in terms of weight and all temperatures as degrees Fahrenheit (° F.).

In each example, bis(hydroxyethyl)-terephthalate is produced by reacting a mixture of ethylene glycol and terephthalic acid in a 15:1 molar ratio and containing the designated proportion of diisopropyl di-triethanolamine ortho-titanate catalyst in a one-gallon batch reactor fitted with a sampling valve, a 10-tray Oldershaw fractionating column and a reflux splitter. During the atmospheric pressure reactions, the temperature of the reaction mixtures are held within the ranges set forth in the table hereinafter, and the overhead temperature is maintained at 210–212° F., for efficient removal of the water formed by the reaction while glycol vapor is condensed and returned to the reactor. Trimethylamine in substantial excess is bubbled through the reaction mixture at a rate of 0.6 mol per hour per mol of terephthalic acid for the specified duration of the runs in Examples 1 and 2, and for a shorter period in Example 3. No change in the solubility of the terephthalic acid is observed when the amine is introduced, and the amine leaving the reaction slurry is withdrawn from the reactor at a rate that apparently corresponds with the rate of introducing the amine.

Slurry samples, taken at the end of each reaction and also after the first hour of the reaction period in Examples A and 1, are analyzed by gas-liquid chromatography to determine the composition of the products and extent of the reaction. Relative determinations of an incompletely identified heavy by-product are made by arbitrarily assigning it a "K" factor of 1.0 in calculating the analysis. However, there is substantial evidence that this material is actually the mixed ester of terephthalic acid with 1 mol each of diethylene glycol and of ethylene glycol, that is, an undesirable ether-ester of relatively high molecular weight. The results of these analyses are set forth in the following tabulation along with reaction conditions and the calculated mol percent conversion of terephthalic acid to the desired bis(hydroxyethyl)-terephthalate and to the undesirable bound ether compounds of terephthalic acid. The tabulated mol percent of bound ether includes the aforementioned heavy by-product but not the free diethylene glycol in the reaction products.

TABLE

| Example | Run conditions | | | | Product analyses, wt. percent | | | | | Bound ether [f] mol percent | bisHET yield, mol percent |
|---|---|---|---|---|---|---|---|---|---|---|---|
| | Cat./TPA [a] wt. ratio | Amine added | Temp., ° F. | Time, hrs. | bisHET [b] | monoHET [c] | TPA | Heavy by-prod. [d] | FDEG [e] | | |
| A | 0.001 | No | 383–390 | 1 | 3.2 | 4.9 | 8.0 | 0.1 | 0.1 | | 15.0 |
| A | 0.001 | No | 383–390 | 5 | 22.9 | 0.2 | 0.1 | 0.3 | 0.8 | 0.8 | 98.3 |
| 1 | 0.001 | Yes | 381–386 | 1 | 17.4 | 3.7 | 0.3 | <0.1 | <0.1 | | 28.6 |
| 1 | 0.001 | Yes | 381–386 | 5 | 24.5 | 0.4 | 0.1 | <0.1 | 0.4 | | 97.5 |
| 2 | 0.01 | Yes | 365–390 | 6 | 23.1 | 0.5 | <0.1 | <0.1 | 0.3 | | 97.5 |
| 3 | 0.001 | Yes [g] | 374–378 | 5 | 22.5 | 1.3 | 0.2 | <0.1 | 0.1 | 0.5 | 92.4 |

[a] Catalyst/terephthalic acid ratio by weight.
[b] Bis(hydroxyethyl)-terephthalate.
[c] Monohydroxyethyl terephthalate.
[d] A proportional weight value (not weight percent) indicating the relative concentration of a heavy by-product of uncertain identity and having a somewhat higher molecular weight than other reaction products.
[e] Free (uncombined) diethylene glycol.
[f] Ratio of ether linkages [—O—(CH$_2$)$_2$—O—(CH$_2$)$_2$—O—] to total ether plus glycol linkages [—O—(CH$_2$)$_2$—O—] in the saponifiable portion of the sample.
[g] Amine added only during the first two hours of this run, and the reaction product mixture contains 0.008% of trimethylamine by weight which is equivalent to 0.053% of the terephthalic acid charged and 53% of the catalyst weight.

The analytical results set forth in the aforesaid examples clearly demonstrate a substantial inhibition or suppression of the etherification side reactions in all instances when the amine is present in the catalytic esterification reaction mixtures, for there is a significant reduction in the content of all three types of undesired ethers, namely, bound ether, diethylene glycol, and the unidentified heavy by-product, in the reaction products of the illustrative numerical examples in contrast with Comparative Example A where the amine additive is not employed. Accordingly, the products of the process of this invention are distinctly superior intermediates for further processing into polyethylene terephthalate of fiber and time cord grades.

In addition, calculation of the yields or degrees of conversion to bis(hydroxyethyl)-terephthalate from the analyses of the 1-hour samples in Examples A and 1 indicate a marked increase in the reaction rate during the initial stage of these batch reactions which may be attributed to the addition of the amine. A 10-fold increase in the concentration of the organo-titanium esterification catalyst in Example 2 produces a final product similar to that of Example 1.

In Example 3, the same degree of inhibiting ether formation is obtained with only 40% of the total amount of amine utilized in Example 1, and it is contemplated that the slightly lower yield of Example 3 might be improved by a small increase in reaction temperature or time.

Although the practice of the present invention has been described with particular reference to detailed examples utilizing substantially the same specific charge materials under generally similar reaction conditions for purposes of detailed and comparative illustration of the invention, it will be apparent to those skilled in the art that many modifications relative to reactants, catalysts, additives, and process conditions fall within the purview of this invention. Accordingly, the present invention should not be construed as limited in any particulars except as may be set forth in the appended claims or required by the prior art.

What is claimed is:

1. In a process for the catalytic liquid phase esterification of an aromatic polycarboxylic acid or aromatic polycarboxylic anhydride with a glycol, the improvement which comprises carrying out said esterification reaction in the joint presence of catalytic quantities of (1) an alkyl amine more volatile than said glycol, and wherein each alkyl group of said amine contains from 1 to 4 carbon atoms, and of (2) a different substance which is an alkyl alkanolamine compound containing at least one alkoxy radical and at least one amino-alkoxy radical and having the formula $MX_4$ in which M represents titanium or zirconium and each X individually designates an alkoxy or amino-alkoxy radical with at least one said X radical containing from 2 to 18 carbon atoms, and wherein the quantity of said amine charged is at least 10% of the weight of said alkyl alkanolamine compound.

2. A process, according to claim 1 in which said alkyl amine is a tertiary amine.

3. A process according to claim 1 for the esterification of terephthalic acid with a glycol in which said compound is an alkyl alkanolamine orthotitanate esterification catalyst and the quantity of said alkyl amine is sufficient to suppress ether formation.

4. A process according to claim 3 in which said compound is diisopropyl di-triethanolamine ortho-titanate.

5. A process according to claim 4 in which said glycol is ethylene glycol and said alkyl amine is trimethylamine.

6. A process according to claim 3 in which said alkyl amine is a tertiary amine.

7. In a process for the catalytic liquid phase esterification of terephthalic acid with a glycol followed by polymerization of the esterification product, the improvement which comprises carrying out said esterification reaction in the joint presence of catalytic quantities of (1) an alkyl amine more volatile than said glycol, and wherein each alkyl group of said amine contains from 1 to 4 carbon atoms, and of (2) a different substance which is of an alkyl alkanol-amine compound containing at least one alkoxy radical and at least one amino-alkoxy radical and having the formula $MX_4$ in which M represents titanium or zirconium and each X individually designates an alkoxy or amino-alkoxy radical with at least one said X radical containing from 2 to 18 carbon atoms, and wherein the quantity of said amine charged is at least 10% of the weight of said alkyl alkanolamine compound; and subjecting the resulting esterification product to polymerization conditions for a period sufficient for the formation of polymeric material having a weight average molecular weight between about 1800 and 10,000.

8. A process according to claim 7 in which said polymeric material is subjected to polycondensation conditions for a period sufficient to form polymers having a weight average molecular weight above about 17,000.

References Cited

UNITED STATES PATENTS

| | | | |
|---|---|---|---|
| 3,056,818 | 10/1962 | Werber | 260—75 X |
| 3,060,152 | 10/1962 | Ringwald | 260—75 |
| 3,326,965 | 6/1967 | Schultheis | 260—475 |
| 3,444,140 | 5/1969 | Stewart et al. | 260—75 |

WILLIAM SHORT, Primary Examiner

L. P. QUAST, Assistant Examiner

U.S. Cl. X.R.

260—468 R, 468 P, 469, 471 R, 473 R, 475 R, 475 P, 478, 484 R, 485 R, 485 G, 486 R, 486 H, 487, 488 R, 488 J

PO-1050
(5/69)

UNITED STATES PATENT OFFICE
CERTIFICATE OF CORRECTION

Patent No. 3,644,293      Dated February 22, 1972

Inventor(s) GLENN D. FIELDER

It is certified that error appears in the above-identified patent and that said Letters Patent are hereby corrected as shown below:

Column 5, line 12, change "(poly)ethylene glycol)" to --(polyethylene glycol)--

Column 5, line 18, delete entire line, beginning "ene" and ending "tetra-"

Column 5, line 59, change "10.0%" to --1000%--

Column 6, line 13, change "selection if" to --selection of--

Column 8, In the Table under "Amine Added", for Example 3, change "yes" to --(g) yes--

Column 8, line 41, change "time cord grades" to --tire cord grades--

Signed and sealed this 3rd day of October 1972.

(SEAL)
Attest:

EDWARD M. FLETCHER, JR.
Attesting Officer

ROBERT GOTTSCHALK
Commissioner of Patents